United States Patent
Roberson, II et al.

(10) Patent No.: US 11,151,093 B2
(45) Date of Patent: Oct. 19, 2021

(54) DISTRIBUTED SYSTEM CONTROL FOR ON-DEMAND DATA ACCESS IN COMPLEX, HETEROGENOUS DATA STORAGE

(71) Applicant: INTERNATIONAL BUSINESS MACHINES CORPORATION, Armonk, NY (US)

(72) Inventors: Harold J. Roberson, II, Rochester, MN (US); Christopher J. Tan, Austin, TX (US); Robert B. Basham, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 16/370,513

(22) Filed: Mar. 29, 2019

(65) Prior Publication Data
US 2020/0311033 A1    Oct. 1, 2020

(51) Int. Cl.
*G06F 16/182*    (2019.01)
*G06F 16/11*     (2019.01)
*G06F 11/14*     (2006.01)
*G06F 21/44*     (2013.01)

(52) U.S. Cl.
CPC ........ *G06F 16/182* (2019.01); *G06F 11/1464* (2013.01); *G06F 16/122* (2019.01); *G06F 21/44* (2013.01); *G06F 2201/80* (2013.01)

(58) Field of Classification Search
CPC .. G06F 16/182; G06F 16/122; G06F 11/1464; G06F 21/44; G06F 2201/80
USPC .......................................................... 707/652
See application file for complete search history.

(56) References Cited

U.S. PATENT DOCUMENTS

| | | | |
|---|---|---|---|
| 6,769,022 B1* | 7/2004 | DeKoning | H04L 29/06 709/201 |
| 7,395,536 B2* | 7/2008 | Verbeke | G06F 9/5055 709/200 |
| 7,958,515 B2* | 6/2011 | Tcherevik | G06F 9/542 719/318 |
| 8,429,630 B2* | 4/2013 | Nickolov | H04L 67/1014 717/148 |

(Continued)

FOREIGN PATENT DOCUMENTS

EP    1993245 A1 *  11/2008    ........... H04L 51/36

OTHER PUBLICATIONS

Ernvall et al., "Capacity and Security of Heterogeneous Distributed Storage Systems," 2013 IEEE International Symposium on Information Theory, IEEE, 2013, pp. 1247-1251. (Year: 2013).*

(Continued)

*Primary Examiner* — Phuong Thao Cao
(74) *Attorney, Agent, or Firm* — Konrad Raynes Davda & Victor LLP

(57) ABSTRACT

Distributed system controllers provide on-demand data access in complex, heterogenous data storage. In one embodiment, the distributed system controllers respond to name space metadata event messages published on a persistent message but to maintain a common name space in a complex of heterogenous data storage systems. In one embodiment, data unit access request metadata messages are propagated in recursive, cascading hops along a persistent message bus until the requested data unit is located and retrieved. Other features and aspects may be realized, depending upon the particular application.

24 Claims, 8 Drawing Sheets

(56) References Cited

U.S. PATENT DOCUMENTS

| | | | | |
|---|---|---|---|---|
| 8,443,011 | B2* | 5/2013 | Kandlikar | G06F 3/0481 707/805 |
| 9,134,921 | B1* | 9/2015 | Li | G06F 3/0632 |
| 9,189,495 | B1 | 11/2015 | Hughes et al. | |
| 9,613,190 | B2* | 4/2017 | Ford | G06F 21/62 |
| 9,665,446 | B1* | 5/2017 | Hadas | G06F 11/3058 |
| 9,805,054 | B2* | 10/2017 | Davis | G06F 16/1752 |
| 9,811,531 | B2* | 11/2017 | Karamanolis | G06F 16/182 |
| 9,841,929 | B1* | 12/2017 | Cho | G06F 3/061 |
| 9,984,083 | B1* | 5/2018 | Tiwari | G06F 16/24524 |
| 10,089,676 | B1* | 10/2018 | Gupta | G06Q 30/0633 |
| 10,152,386 | B1* | 12/2018 | Ramachandran | G06F 3/067 |
| 10,162,735 | B2* | 12/2018 | Bhat | G06F 11/3664 |
| 10,180,807 | B2* | 1/2019 | Misra | G06F 3/0647 |
| 10,545,982 | B1* | 1/2020 | Kramer | G06F 16/27 |
| 2002/0069274 | A1* | 6/2002 | Tindal | H04L 43/00 709/223 |
| 2002/0144028 | A1* | 10/2002 | Schatzberg | G06F 3/0659 710/36 |
| 2005/0235197 | A1* | 10/2005 | Betts | G06F 16/30 715/256 |
| 2008/0126369 | A1* | 5/2008 | Ellard | G06F 16/10 |
| 2008/0140724 | A1* | 6/2008 | Flynn | G06F 12/0804 |
| 2008/0155191 | A1* | 6/2008 | Anderson | G06F 11/1076 711/114 |
| 2009/0157853 | A1* | 6/2009 | Doi | G06F 16/51 709/220 |
| 2012/0185437 | A1* | 7/2012 | Pavlov | G06F 16/182 707/652 |
| 2012/0259901 | A1* | 10/2012 | Lee | G06F 9/5072 707/827 |
| 2013/0166714 | A1* | 6/2013 | Xu | G06F 11/2094 709/223 |
| 2014/0006465 | A1* | 1/2014 | Davis | G06F 16/183 707/827 |
| 2014/0040205 | A1* | 2/2014 | Cometto | G06F 9/4411 707/639 |
| 2015/0089283 | A1* | 3/2015 | Kermarrec | G06F 3/0689 714/6.32 |
| 2015/0134708 | A1* | 5/2015 | Cutforth | G06F 3/0617 707/809 |
| 2015/0242454 | A1* | 8/2015 | Bakre | G06F 16/196 707/652 |
| 2015/0278397 | A1* | 10/2015 | Hendrickson | G06F 16/9024 707/798 |
| 2015/0301749 | A1* | 10/2015 | Seo | G06F 11/1076 714/6.24 |
| 2016/0063027 | A1 | 3/2016 | Brand | |
| 2016/0132538 | A1* | 5/2016 | Bliss | G06F 16/20 707/741 |
| 2016/0150019 | A1* | 5/2016 | Klinkner | H04L 67/10 709/203 |
| 2017/0091075 | A1* | 3/2017 | Bhat | G06F 11/3688 |
| 2017/0279678 | A1* | 9/2017 | Kleynhans | H04L 41/0816 |
| 2018/0025403 | A1 | 1/2018 | Mckay et al. | |
| 2018/0032258 | A1* | 2/2018 | Edwards | G06F 16/184 |
| 2018/0052451 | A1* | 2/2018 | Billi-Duran | G05B 19/41835 |
| 2018/0054490 | A1* | 2/2018 | Wadhwa | G01S 5/0263 |
| 2018/0089870 | A1* | 3/2018 | Billi-Duran | G06T 11/60 |
| 2018/0095991 | A1* | 4/2018 | Karamanolis | G06F 16/188 |
| 2018/0203641 | A1* | 7/2018 | Petrocelli | G06F 3/0659 |
| 2018/0239537 | A1* | 8/2018 | d'Abreu | G06F 3/0644 |
| 2019/0018844 | A1* | 1/2019 | Bhagwat | H04L 69/00 |
| 2019/0018870 | A1* | 1/2019 | Bhagwat | G06F 16/2228 |
| 2019/0132415 | A1* | 5/2019 | Viswanathan | H04L 67/289 |
| 2019/0190800 | A1* | 6/2019 | Agarwal | H04L 41/5058 |
| 2020/0097354 | A1* | 3/2020 | Barnett | G06F 11/16 |

OTHER PUBLICATIONS

Zhu et al., "An architecture for aggregating information from distributed data nodes for industrial internet of things," Computers and Electrical Engineering 58, 2017, pp. 337-349. (Year: 2017).*

Anonymous, "An Apparatus for Autonomic Backup of Complex Data Systems in a Cloud Computing Environment", IP.Com No. IPCOM000223174D, Nov. 6, 2012, 4 pp.

Anonymous, "Policy-Driven Method and System to Automate the Provisioning of Shared Storage Space in a Cloud Environment", ip.com No. IPCOM000220017D, Jul. 18, 2012, 5 pp.

Anonymous, "System and Method for Effective Service Chaining in a Shared Environment", ip.com No. IPCOM000244455D, Dec. 13, 2015, 6 pp.

Bampi, R., "LenticularFS: Scalable Filesystem for the Cloud", Aalto University School of Science, Master's Thesis, Feb. 10, 2017, 62 pp.

Cloud Standards Customer Counsel, "Hybrid Cloud Considerations for Big Data Analytics", © Jul. 2017, 26 pp.

IBM Corp., "Ensuring that Messages are Not Lost", [online], [Retrieved on Mar. 1, 2019], Retrieved from the Internet at <URL: https://www.ibm.com/support/knowledgecenter/en/SSMKHH_9.0.0/com.ibm.etools.mft.doc/ac00420_.htm>, 5 pp.

IBM Corp., "Scale Out Backup and Restore (SOBAR) for Cloud Services—Overview", [online], [Retrieved on Jan. 18, 2019], Retrieved from the Internet at <URL: https://www.ibm.com/support/knowledgecenter/en/STXKQY_5.0.1/com.ibm.spectrum.scale.v5r01.doc/bl1adm_introsobar.htm>, 4 pp.

Rouse, M., "Data Life Cycle", [online], [Retrieved on Feb. 4, 2019], Retrieved from the Internet at <URL: https://whatis.techtarget.com/definition/data-life-cycle>, 4 pp.

Symantec Corp., "Veritas Storage Foundation Cluster File System High Availability Administrator's Guide", Version 6.0, Nov. 2011, 995 pp.

Wikipedia, "File System", [online], last edited Dec. 11, 2018 [Retrieved on Dec. 21, 2018], Retrieved from the Internet at <URL: https://en.wikipedia.org/wiki/File_system>, 21 pp.

Wikipedia, "Object Storage", [online], last edited Dec. 17, 2018 [Retrieved on Dec. 21, 2018], Retrieved from the Internet at <URL: https://en.wikipedia.org/wiki/Object_Storage>, 10 pp.

* cited by examiner

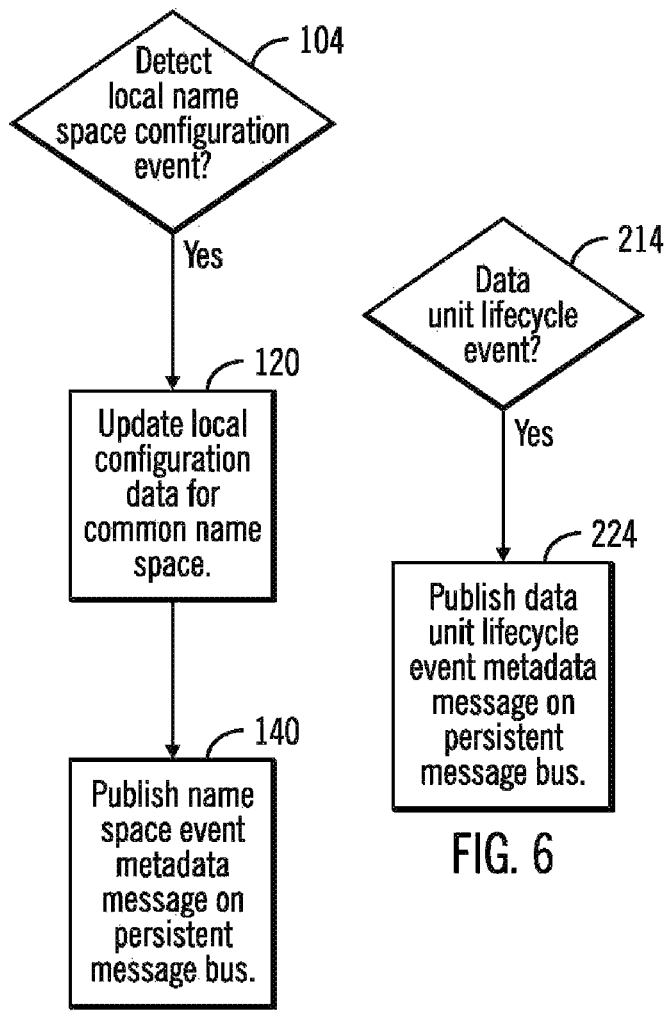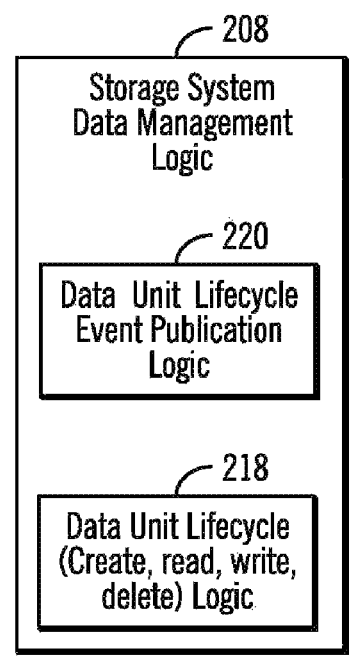

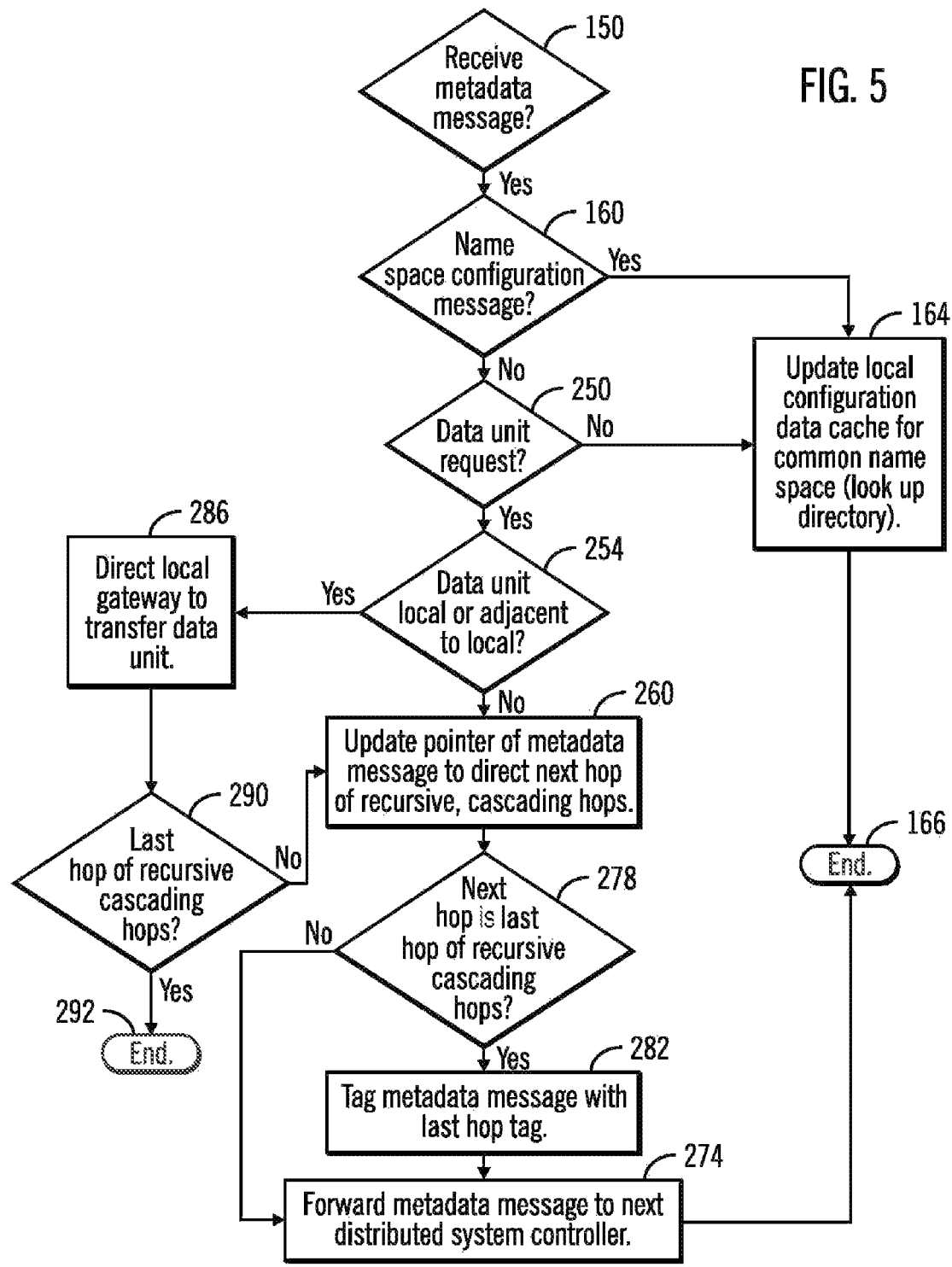

DISTRIBUTED SYSTEM CONTROL FOR ON-DEMAND DATA ACCESS IN COMPLEX, HETEROGENOUS DATA STORAGE

BACKGROUND OF THE INVENTION

1. Field of the Invention

The present invention relates to a computer program product, system, and method for on-demand data access in complex, heterogenous data storage systems.

2. Description of the Related Art

There are various types of data storage architectures. An increasingly popular choice for data storage and particularly for cloud storage, is object storage that manages data as objects as compared to other data storage architectures such as file systems which manage data as files in a hierarchical system of folders and subfolders, or directories and subdirectories, for example. Due to the increasing popularity of object storage, new applications tend to be written so as to have the capability of producing and accessing data in object form in the cloud, whereas older applications continue to produce and access data as files.

As a result, businesses may need to store and access data in file system storage as well as store and access data in object storage. Some types of data may be stored exclusively in a file system storage and other types of data may be more suitable for object storage. For example, frequently accessed data may be stored locally in what may be a file system storage and data less frequently accessed may be stored in distant object storage such as in the cloud. However, the need frequently arises to share data between both file system storage and object storage, particularly as more applications are employed to create and access data natively in object storage.

Various gateways have been devised to provide a degree of access between a file system storage and an object storage which are directly connected by a gateway in a hybrid or heterogenous storage having both a file domain and an object domain. These gateways provide an interface by which data stored as a file in a file system storage, may be transferred to adjacent object storage for storage as an object, and vice versa.

To provide ready access on-demand to the same data in both a file system storage domain and an object storage domain, a copy of the data is typically stored in both domains. However, such duplication of data may be wasteful, particularly for data unlikely to be frequently accessed in both domains. Accordingly, it is known to store the actual data in one domain such as the object storage domain, and store just metadata describing that data, in a different but adjacent domain such as the file system domain. For example, the Cloud Data Sharing storage service marketed by International Business Machines Corporation (IBM) provides the capability to import from object storage, stubs, that is, inodes with no data blocks, into a filesystem. Importation of stubs may be driven in response to certain events, but the actual movement of data into the file system occurs in limited situations such as execution of an explicit file system policy, or execution of a Command Line Interface (CLI) request, for example.

SUMMARY

On-demand data access in complex, heterogenous data storage in accordance with the present description provides a significant improvement in computer technology. In one embodiment, a plurality of heterogeneous data storage systems are established as linked in a graph configuration in which each storage system is linked directly to one or more adjacent storage systems, and is linked indirectly to one or more non-adjacent storage systems, via at least one intermediate storage system. In one embodiment, a storage system of the plurality of heterogeneous data storage systems has an object domain. A common name space is established for data units stored in the plurality of heterogeneous data storage systems. Distributed system controllers associated with the plurality of heterogeneous data storage systems provide globally available distributed services including, for example, distributed configuration services enforcing access privileges to data units stored in the plurality of heterogeneous data storage systems, and respond to events in the common name space to achieve eventual consistency of distributed services in the entire common name space.

Distributed system controllers in accordance with the present description can reduce or eliminate data duplication for purposes of providing on-demand data access, yet can provide such on-demand data access transparently in each data storage system of a heterogenous data storage complex of data storage systems, notwithstanding that various data storage systems of the complex employ entirely different storage domains such as an object storage domain or a file system domain, for example. In one embodiment, globally available distributed services of the distributed system controllers further comprise a source distributed system controller publishing on a persistent message bus, a common name space configuration event metadata message in response to a common name space configuration event. In one example, a common name space configuration event includes a change in access privileges to a data unit stored in a data storage system of the plurality of heterogeneous data storage systems. Distributed system controllers in response to a published common name space configuration event metadata message received on a persistent message bus, conform distributed services as a function of a common name space configuration event to achieve eventual consistency of distributed services in the entire common name space. In one example, conformed distributed services include consistent data unit access privileges in the entire common name space.

Distributed system controllers in accordance with the present description can provide transparent on-demand data access notwithstanding that the data access request originates in one data storage system of the complex, but the data is actually stored in yet another data storage system of the complex in which neither data storage system is adjacent to nor directly linked to each other by a gateway.

In one embodiment, a source data storage system publishes on a persistent message bus, a data unit life cycle event metadata message in response to a data unit life cycle event. In one example, a data unit life cycle event includes a change to a data unit stored in a data storage system of the plurality of heterogeneous data storage systems. In this embodiment, globally available distributed services of the distributed system controllers further comprise distributed system controllers in response to a published data unit life cycle event metadata message received on a persistent message bus, conforming distributed services as a function of a data unit life cycle event to achieve eventual consistency of distributed services in the entire common name space. In one example, conformed distributed services include eventually consistent data unit name look-up directory services in the entire common name space.

Distributed system controllers in accordance with the present description permit a candidate data storage system for storing data to be selected in a heterogenous data storage complex on the basis of cost for example, instead of whether the type of storage domain the candidate system employs is compatible with the storage domain of a user's own data storage system or whether the candidate system is directly connected to the user's own data storage system by a gateway. As a result, storage system efficiency may be significantly improved in a heterogenous data storage complex.

In one embodiment, a source data storage system initiates on a persistent message bus, a data unit access request metadata message in response to a data unit request to access a data unit stored in a data storage system of the plurality of heterogeneous data storage systems. The globally available distributed services by a distributed controller include responding to a received data unit access request metadata message by directing an associated gateway between adjacent data storage systems to transfer a data unit requested by the received data unit access request metadata message if a requested data unit is stored in a data storage system coupled to the associated gateway. The received data unit access request metadata message is propagated to another distributed controller in a selected path if a requested data unit is not stored in a data storage system coupled to the associated gateway.

In one aspect, propagating a data unit access request metadata message includes distributed system controllers recursively modifying, as a function of conformed, consistent data unit name look-up directory services, a pointer in the received data unit access request metadata message in a plurality of recursive, cascading hops in the selected path from a source distributed system controller which received a data unit access request metadata message, via an intermediate distributed system controller, to a destination distributed system controller associated with a destination data storage system storing requested user data of a data unit access request. As a result, the data unit access request metadata message is forwarded and guided in the selected path including at least one persistent message bus to another distributed controller along the selected path, to recursively issue at each distributed system controller along the selected path, a data unit access request until requested user data is retrieved from the destination storage system. In one embodiment, propagating a data unit access request metadata message includes an intermediate distributed system controller adding, as a function of a conformed, consistent data unit name look-up directory, a tag to a received data unit access request metadata message to indicate whether a next hop is a final hop of the plurality of recursive, cascading hops, and forwarding the tagged metadata message to the destination distributed system controller. A destination distributed system controller responds to a received data unit access request metadata message by directing a gateway associated with the destination data storage system to transfer user data of a data unit requested by the received data unit access request metadata message.

In yet another aspect, conformed distributed services are a function of configuration data stored in association with each distributed system controller, which is backed up to provide a backup copy of configuration data. In one example, the backup copy includes a backup copy of a look-up directory of data unit names. As a result, look-up directory services may be restored as a function of a backup copy of a look-up directory of data unit names.

In still another aspect, a storage system may be added to the plurality of heterogenous storage systems and the common name space extended to the added storage system. In one example, a copy of a look-up directory of data unit names of an existing storage system of the plurality of heterogenous storage systems in the common name space is cloned and mined for selected data unit name entries. The added storage system is configured to have a look-up directory using the mined data unit name entries, to extend the common name space to the added storage system.

BRIEF DESCRIPTION OF THE DRAWINGS

FIG. 3 illustrates an example of automatic operations of a distributed system controller of the computing environment of FIG. 1, employing on-demand data access in complex heterogenous data storage in accordance with one aspect of the present description.

FIG. 5 illustrates another example of automatic operations of a distributed system controller of the computing environment of FIG. 1, employing on-demand data access in complex, heterogenous data storage in accordance with one aspect of the present description.

FIG. 6 illustrates an example of automatic operations of a data storage system of the computing environment of FIG. 1, employing on-demand data access in complex, heterogenous data storage in accordance with one aspect of the present description.

FIG. 7 illustrates an example of data management logic of a data storage system of the computing environment of FIG. 1, employing on-demand data access in complex, heterogenous data storage in accordance with one aspect of the present description.

DETAILED DESCRIPTION

On-demand data access in complex, heterogenous data storage in accordance with the present description provides a significant improvement in computer technology. As described in greater detail below, distributed system controllers in accordance with the present description can reduce or eliminate data duplication for purposes of providing on-demand data access, yet can provide such on-demand data access transparently in each data storage system of a heterogenous data storage complex of data storage systems, notwithstanding that various data storage systems of the complex employ entirely different storage domains such as an object storage domain or a file system domain, for example.

Furthermore, distributed system controllers in accordance with the present description can provide such transparent on-demand data access notwithstanding that the data access request originates in one data storage system of the complex, but the data is actually stored in yet another data storage system of the complex in which neither data storage system is adjacent to nor directly linked to each other by a gateway. Accordingly, a candidate data storage system for storing data may be selected in a heterogenous data storage complex on the basis of cost for example, instead of whether the type of storage domain the candidate system employs is compatible with the storage domain of a user's own data storage system or whether the candidate system is directly connected to the user's own data storage system by a gateway. As a result, storage system efficiency may be significantly improved in a heterogenous data storage complex.

Figure 1:
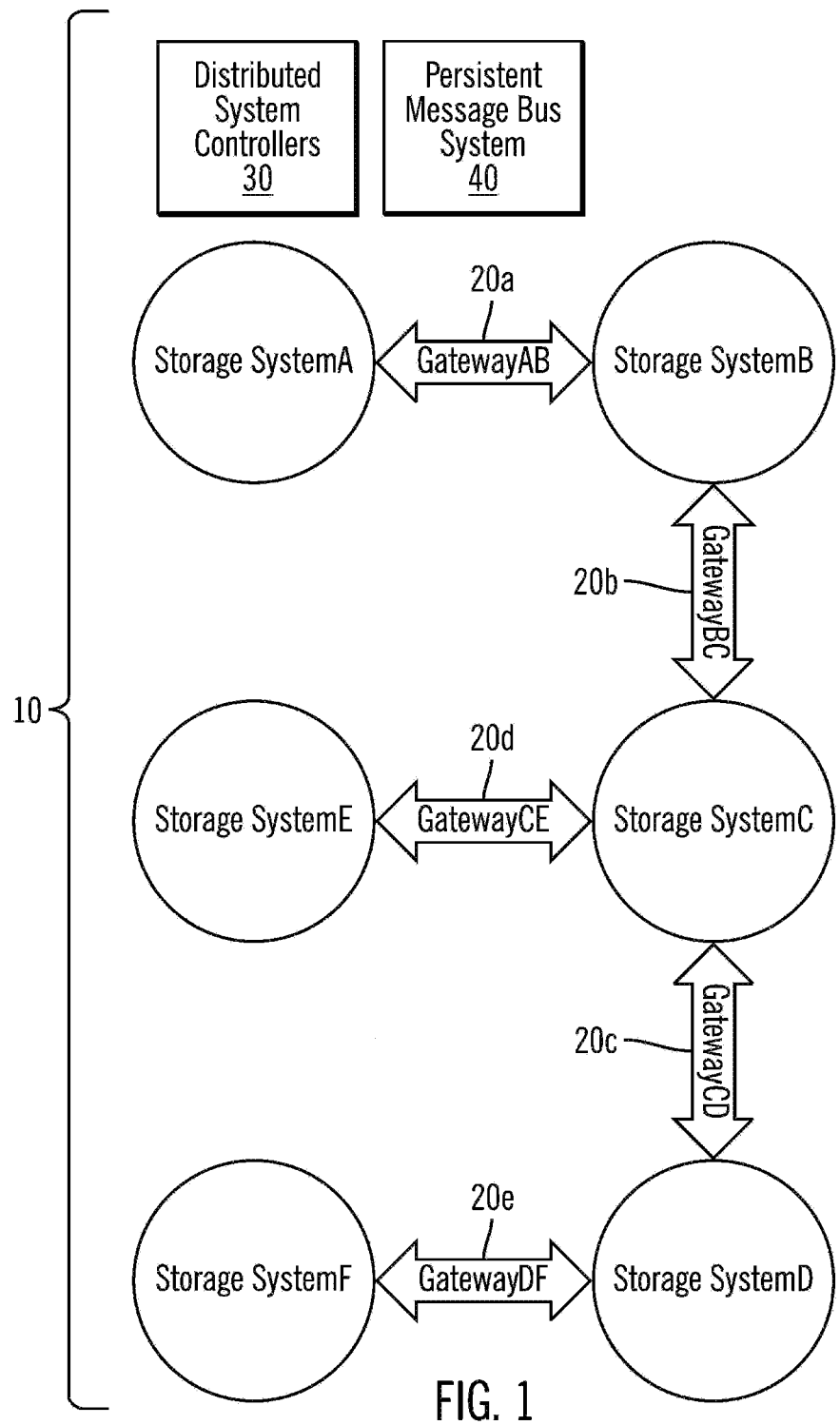
FIG. 1 illustrates an embodiment of a computing environment employing on-demand data access in complex, heterogenous data storage systems in accordance with one aspect of the present description.
Figure 2:
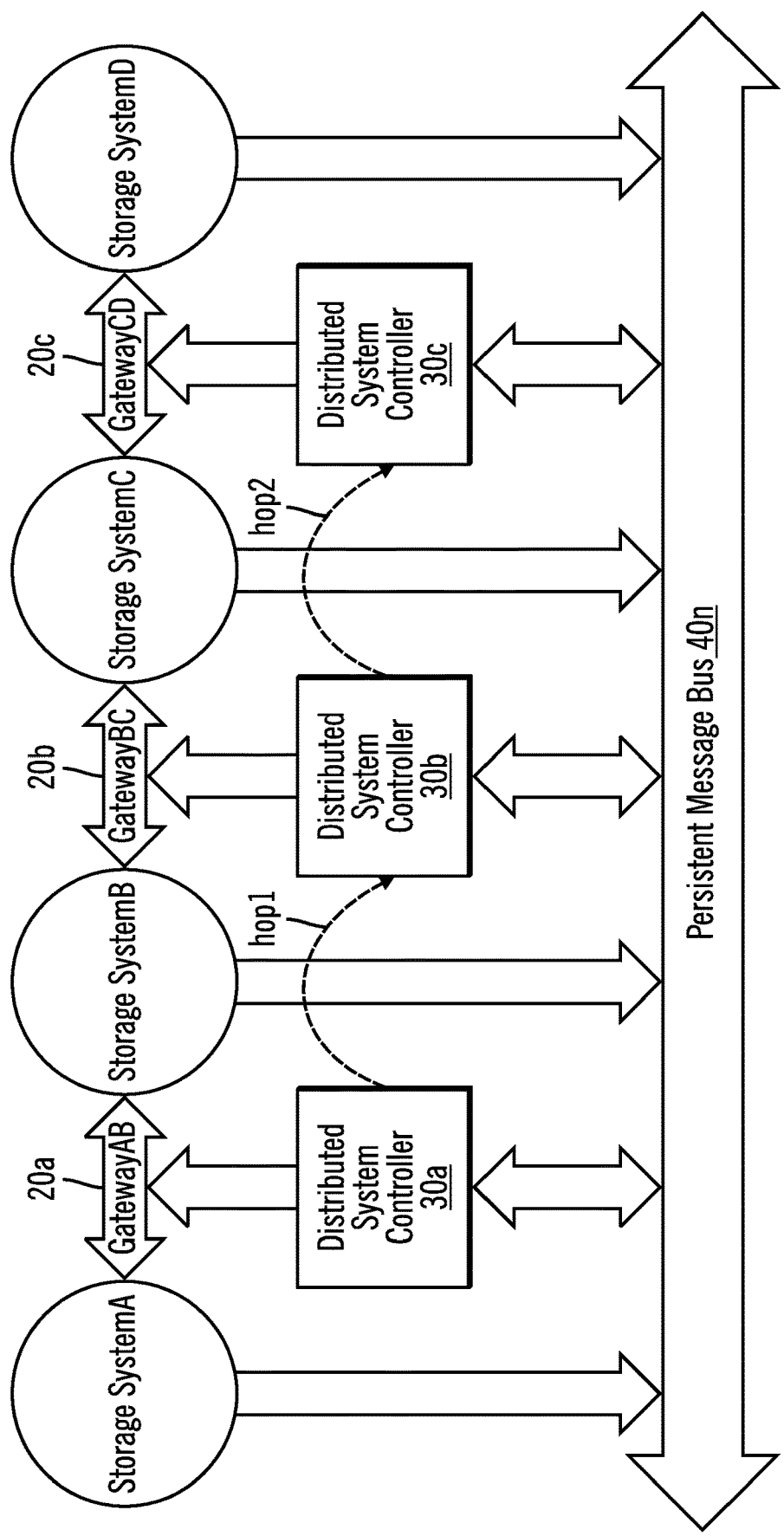
FIG. 2 illustrates a more detailed example of a portion of the computing environment of FIG. 1, employing on-demand data access in complex, heterogenous data storage in a data storage system in accordance with one aspect of the present description.

FIGS. 1-2 illustrate an embodiment of a computing environment employing on-demand data access in a heterogenous data storage complex 10 (FIG. 1) in accordance with the present description. The complex 10 of data storage systems include a plurality of heterogeneous data storage systems represented by storage systems, systemA-systemF, linked in a complex graph configuration in which each storage system is linked directly to an adjacent storage system, and is also linked indirectly to a non-adjacent storage system, via at least one intermediate storage system. Thus, the storage systemA is linked by a gateway connection 20a directly to an adjacent storage systemB which in turn is linked directly to an adjacent storage systemC by a gateway connection 20b. As used herein, a gateway connection refers to a network connection between adjacent data storage systems, together with a gateway service associated with the network connected adjacent data storage systems which facilitates data transfers between the adjacent data storage systems which may not be directly compatible such as having different storage domains or protocols. Thus, the gateway connection 20a, for example, is a network connection between the data storage systemA and the data storage systemB, and includes an associated gateway service, gatewayAB, which provides a gateway service between the data storage systemA and the data storage systemB.

Each storage system such as the storage systemA of the complex 10 is also linked indirectly to a non-adjacent storage system such as the storage systemC, for example, by the gateway connection 20a, the storage systemB and a gateway connection 20b. As shown in FIG. 1, the graph position of the storage systemB is intermediate that of the storage systems, systemA and systemC. Thus, the graph configuration of the complex 10 of FIG. 1 includes intermediate storage systems and is referred to herein as a complex graph configuration as compared to graph configurations lacking intermediate storage systems.

The storage systems, systemA-systemF, of the complex 10 are heterogenous such that one ore more of the storage systems may store data in one type of data storage architecture or domain such as a hierarchical file system, for example, and other storage systems may store data in a different type of data storage system architecture or domain such as object storage, for example. In one aspect of on-demand data access in complex, heterogenous data storage systems in accordance with the present description, a common name space is established across the entire graph of the complex 10 of storage systems, systemA-systemF, for data units such as files, objects, and data segments, for example, which are stored in the plurality of heterogeneous data storage systems, systemA-systemF. Thus, a file in a hierarchical file system such as data storage systemA, for example, may have a file name and a file system path of folders, subfolders, directories or subdirectories. In the common name space, the same file stored as an object in an object storage system such as the data storage systemD, for example, has a common name in the object based systemD in the form of an object name based on the file system path plus the file name of the file in the hierarchical file systemA.

When a file is exported to cloud storage such as the data storage systemD, for example, the export may be done with an option to remove the data from the local data storage system such as the data storage systemA, for example, leaving only file metadata on the local file systemA. Thus, if a file with the user file data is exported to the cloud data storage systemD, metadata in the form of a corresponding stub in the local data storage systemA has, in one embodiment, an implicit pointer to where the file user data can be found in the cloud data storage systemD. The cloud object name is the file system path plus the file name.

As explained in greater detail below, the complex 10 of the illustrated embodiment includes distributed system controllers 30 distributed through the common name space of the complex 10, and associated with the heterogenous storage systems, systemA-systemF, of the complex 10. For example, FIG. 2 depicts one embodiment of a portion of the complex 10 in which a distributed system controller 30a of the distributed system controllers 30 (FIG. 1) is associated with data storage systemA and data storage systemB, a distributed system controller 30b of the distributed system controllers 30 is associated with data storage systemB and data storage systemC, and a distributed system controller 30c of the distributed system controllers 30 is associated with data storage systemC and data storage systemD.

The distributed system controllers 30 are configured to provide distributed services globally available to the heterogenous storage systems, systemA-systemF, and the gateway connections 20a-20e, of the complex 10. These globally available distributed services include for example, a distributed configuration service which among other services, enforces throughout the common name space, eventually consistent access privileges to data units stored in any of the heterogenous storage systems, systemA-systemF, of the complex 10. The distributed configuration services further include for example, responding to events in the common name space which can alter configurations in the common name space. For example, the distributed configuration services respond to an event which alters a data unit name in one portion of the common name space, to achieve eventual consistency of that data unit name in the entire common name space of the complex 10. In this manner, the distributed system controllers 30 maintain the common name space notwithstanding the heterogenous nature of the different storage systems of the complex 10 of heterogenous storage system 10, and the occurrence of events which can alter distributed services in a portion of the common name space.

As explained in greater detail below, the complex 10 of the illustrated embodiment further includes a persistent message bus system 40 (FIG. 1) of one or more persistent message busses coupled to each of the distributed system controllers 30 and the data storage systems, systemA-systemF, which facilitate reliable transmission and receipt of metadata messages between and among components of the complex 10. For example, FIG. 2 depicts one embodiment of a portion of the complex 10 in which data storage systems, systemA, systemB, systemC and systemD, are each coupled to a persistent message bus 40*n* of the persistent message bus system 40 (FIG. 1) so that each data storage system can publish name space metadata event messages on the persistent message bus 40*n*. In this example, the distributed system controllers 30*a*, 30*b* and 30*c* are each also coupled to the persistent message bus 40*n* of the persistent message bus system 40 (FIG. 1) so that each distributed system controller can publish, forward and receive name space metadata event messages on the persistent message bus 40*n*. In one embodiment, the metadata messages may lack the user data of a file, object or data segment.

In one aspect of on-demand data access in complex, heterogenous data storage in accordance with the present description, name space events include name space configuration events such as, for example, a change in the configuration of the complex 10 in which linking between data storage systems is modified, data storage systems are added or removed from the complex 10, etc. Another example of a name space configuration event is a modification to data unit access privileges.

FIG. 3 depicts one example of automatic operations of a distributed system controller should a name space configuration event occur with respect to a data storage system associated with the distributed system controller. In this example, distributed configuration logic 102 (FIG. 4) of a distributed system controller 30*a* (FIG. 2) detects (block 104, FIG. 3) a local name space configuration event such as a change in a data unit access privilege in one of the data storage systems, systemA or systemB, associated with the distributed system controller 30*a*. As used herein, a local event refers to an event occurring in a particular distributed system controller or in a data storage system or gateway associated with a particular distributed storage controller, rather than in a geographical sense.

Figure 4:
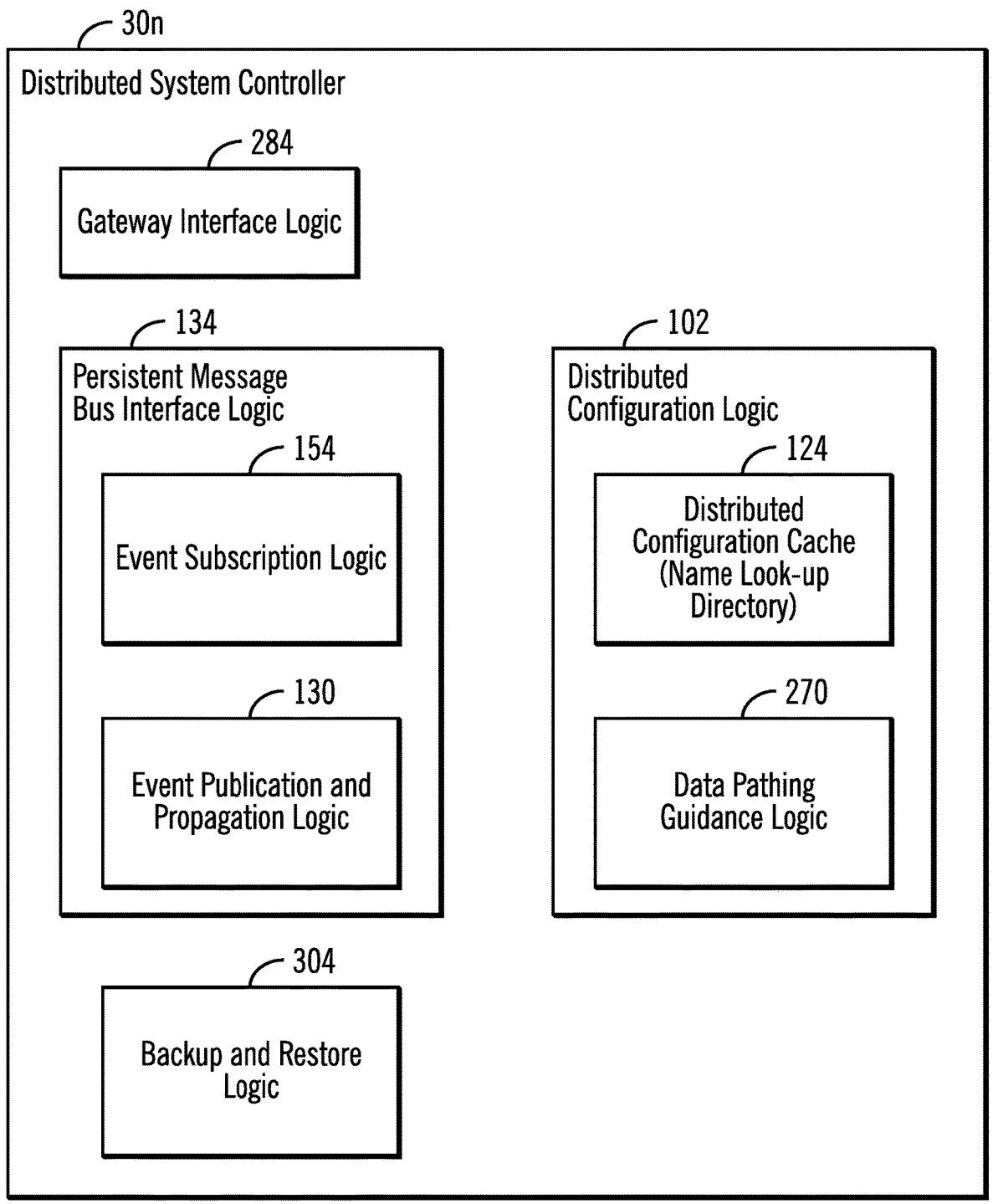
FIG. 4 illustrates an example of a distributed system controller of the computing environment of FIG. 1.

The logic components of FIG. 4 are depicted in connection with a distributed system controller 30*n* intended as representative of each of the distributed system controllers of the complex 10. Hence, the logic components of FIG. 4 are applicable to each of the distributed system controllers of the complex 10. However, it is appreciated that the architectures of the distributed system controllers may vary from controller to controller, depending upon the particular application.

The globally available distributed services of the distributed system controllers further include a local distributed system controller such as the distributed system controller 30*a* updating (block 120, FIG. 3) local configuration data for the common name space in response to a local name space configuration event. In the example of FIGS. 3, 4, distributed configuration logic 102 of the distributed system controller 30*a*, updates configuration data stored in a local distributed configuration cache 124 (FIG. 4) so that the name space configuration data stored in the cache 124 reflects the changes associated with the detected name space configuration event. For example, if the name space event detected by the distributed system controller 30*a* is a change in data unit access privileges, the name space configuration data stored in the cache 124 is updated to reflect those changes in data unit access privileges to prevent unauthorized access to data units.

In one embodiment, the name space configuration data stored in the cache 124 may include a data unit name look-up directory containing for example, data unit names, the storage location of the associated data unit, and the access privileges assigned to the associated data unit. Thus, if the name space event detected by the distributed system controller 30*a* is a change in data unit access privileges, affected data unit access privilege data of the name space configuration data stored in the cache 124 is updated to reflect those changes in data unit access privileges to prevent unauthorized access to data units.

In one aspect of on-demand data access in complex, heterogenous data storage in accordance with the present description, the globally available distributed services of the distributed system controllers further include a local distributed system controller such as the distributed system controller 30*a*, acting as a publication source which publishes on a persistent message bus such as the persistent message bus 40*n* (FIG. 2), a common name space configuration event metadata message in response to a local name space configuration event. In the example of FIGS. 3, 4, name space event publication and propagation logic 130 (FIG. 4) of a persistent message bus interface logic 134 of a distributed system controller such as the controller 30*a* (FIG. 2) acting as a publication source, publishes (block 140, FIG. 3) on the persistent message bus 40*n* (FIG. 2), a name space configuration event metadata message in response to a local name space configuration event. One example of a name space configuration event is a change in access privileges assigned to a data unit in which the access privilege change was effected locally such as, for example, in source distributed system controller 30*a* or alternatively in gatewayAB (FIG. 2) or data storage systemA or systemB associated with the source distributed system controller 30*a*.

As explained in greater detail below, publication of a name space configuration event metadata message in response to a local name space configuration event, facilitates conforming configuration data maintained by other, non-local distributed system controllers of the complex 10, to reflect or propagate the name space configuration changes resulting from the detected name space configuration event, throughout the common name space of the complex 10. For example, non-local caches of configuration data for the common name space may be updated across the common name space to facilitate providing globally available distributed services of the distributed system controllers which are consistent across the common name space.

FIG. 5 depicts one example of automatic operations by a distributed system controller in response to receipt (block 150, FIG. 5) of a metadata message published by another distributed system controller or by a data storage system of the complex 10 (FIG. 1). In this example, event subscription logic 154 (FIG. 4) of the persistent message bus interface logic 134 of the receiving distributed system controller such as the distributed system controller 30*b* (FIG. 2), for example, determines (block 160, FIG. 5) whether the received metadata message is a name space configuration event metadata message. If so, a name space metadata event message receiving distributed system controller such as the distributed system controller 30*b*, automatically updates (block 164, FIG. 5) its own local configuration data for the common name space in response to a name space configuration event detected by another distributed system controller such as the controller 30*a* as described above.

In the example of FIGS. 4, 5 distributed configuration logic 102 of the distributed system controller 30*b*, updates configuration data stored in a local distributed configuration cache 124 (FIG. 4) so that the name space configuration data stored in the cache 124 of the controller 30*b* also reflects the changes associated with the name space configuration event detected by the controller 30*a* which was local to the detected event. For example, if the name space event initially detected and published by the distributed system controller 30a, is a change in data unit access privileges, the name space configuration data stored in the cache 124 of the distributed system controller 30b is also updated to reflect those changes in data unit access privileges to prevent unauthorized access to data units. Upon completion of the updating of the configuration data in the local cache 124, the operations for the receiving distributed system controller in response to the received name space configuration event metadata message ends (block 166).

In a similar manner, the other distributed system controllers of the complex 10, such as the distributed system controllers 30c-30f may receive a published name space configuration event metadata message on a persistent message bus, and automatically update configuration data stored in a local distributed configuration cache 124 (FIG. 4) associated with each distributed system controller so that the name space configuration data stored in the cache 124 of that controller also reflects the changes associated with the name space configuration event detected by the controller 30a which was local to the detected event. Accordingly, in one aspect of the globally available distributed services, distributed system controllers in response to a published common name space configuration event metadata message received on a persistent message bus, automatically conform distributed services as a function of a common name space configuration event to achieve eventual consistency of distributed services in the entire common name space.

In one embodiment, all distributed system controllers of the complex 10 may subscribe to or listen for all name space configuration event metadata messages published on the persistent message bus system 40 (FIG. 1). However, it is appreciated that in some embodiments, not all name space configuration event metadata messages published on the persistent message bus system 40 may be pertinent to all data storage systems of the complex 10. Thus, event subscription logic 154 (FIG. 4) of each distributed system controller may be configured to subscribe to name space configuration event metadata messages which relate to certain types of name space configuration events which are pertinent to either the receiving distributed system controller or to maintaining the consistency of the globally available distributed services. Conversely, event subscription logic 154 (FIG. 4) of each distributed system controller may be configured to not subscribe to, that is, ignore name space configuration event metadata messages which relate to other types of name space configuration events which are not pertinent to either the receiving distributed system controller nor to maintaining the consistency of the globally available distributed services.

A published name space configuration event metadata message has, in one embodiment, fields which provide sufficient information to permit each receiving distributed system controller to conform its distributed services to achieve eventual consistency in those distributed services.

For example, the name space configuration event metadata message may have fields which identify what event occurred, where the event occurred, when the event occurred, who initiated the event, etc. Thus, if the name space configuration event metadata message relates to a change in data unit access privileges, for example, the name space configuration event metadata message may include fields identifying the event as a change in data unit access privileges, the data units affected, which parties gained or lost access privileges, the nature of the affected access privileges (e.g. read, write, no access privileges), where and when the change in access privileges was effected and the identity of the party that effected the change in access privileges. Using this information, each distributed system controller subscribing to this name space configuration event metadata message can update its name space configuration data to allow authorized access and prevent unauthorized access to data units in accordance with the change in data unit access privileges identified by the received name space configuration event metadata message.

In another aspect of on-demand data access in complex, heterogenous data storage in accordance with the present description, name space events include data unit life cycle events such as, for example, creating, opening, closing, reading from, writing to, deleting, migrating or moving, a data unit such as a file, object or data segment, for example. FIG. 6 depicts one example of automatic operations of a data storage system should a data unit life cycle event occur in that data storage system associated with a distributed system controller. In this example, storage system data management logic 208 (FIG. 7) of a data storage system such as the data storage systemA (FIG. 2), for example, detects (block 214, FIG. 6) a local data unit life cycle event affecting a data unit stored in the complex 10, such as, for example, deletion of a data unit stored in the complex 10. As used herein, a local data unit life cycle event refers to a data unit life cycle event initiated by data unit life cycle logic 218 in a particular data storage system of the complex 10 (FIG. 1), rather than in a geographical sense. Thus, the data unit life cycle logic 218 of each data storage system initiates data unit life cycle events such as, for example, creating, opening, closing, reading from, writing to, deleting, migrating or moving, a data unit such as a file, object or data segment, for example.

The logic components of FIG. 7 are applicable to each of the data storage systems of the complex 10. However, it is appreciated that the architectures of particular data storage systems may vary from system to system, depending upon the particular application.

In one aspect of on-demand data access in complex, heterogenous data storage in accordance with the present description, the globally available distributed services of the complex 10 further include a local data storage system such as the data storage systemA, for example, acting as a publication source which automatically publishes on a persistent message bus such as the persistent message bus 40n (FIG. 2), a data unit life cycle event metadata message in response to a local data unit life cycle event. In the example of FIGS. 6, 7, data unit life cycle event publication logic 220 (FIG. 7) of the storage system data management logic 208 of a data storage system such as the data storage systemA (FIG. 2) acting as a publication source, publishes (block 224, FIG. 6) on the persistent message bus 40n (FIG. 2), a data unit life cycle event metadata message in response to a local data unit life cycle event. One example of a data unit life cycle event is deletion of a data unit such as a file, object or data segment from the complex 10.

As explained in greater detail below, publication of a data unit life cycle event metadata message in response to a local name space configuration event, facilitates conforming configuration data maintained by the distributed system controllers of the complex 10, to reflect or propagate the data unit life cycle changes resulting from the detected data unit life cycle event, throughout the common name space of the complex 10. For example, caches of configuration data for the common name space may be updated across the common name space to facilitate providing globally available distributed services of the distributed system controllers which are eventually consistent across the common name space.

FIG. 5 depicts one example of automatic operations by a distributed system controller in response to receipt (block 150, FIG. 5) of a data unit life cycle event metadata message published by a data storage system of the complex 10 (FIG. 1). In this example, event subscription logic 154 (FIG. 4) of the persistent message bus interface logic 134 of the receiving distributed system controller such as the distributed system controller 30c (FIG. 2), for example, determines (block 160, FIG. 5) whether the received metadata message is a name space configuration event metadata message as described above. However, in this example, the received metadata message is a data unit life cycle event metadata message rather than a name space metadata event message. Accordingly, event subscription logic 154 (FIG. 4) of the persistent message bus interface logic 134 of the receiving distributed system controller also determines (block 250, FIG. 5) whether the received data unit life cycle event metadata message is a data unit access request metadata message. In this example, the received data unit life cycle event metadata message is not a data unit access request metadata message. Accordingly, the receiving distributed system controller such as the distributed system controller 30c, automatically updates (block 164, FIG. 5) its own local configuration data for the common name space in response to the received data unit life cycle event metadata message published in response to the data unit life cycle event detected by a data storage system as described above.

In the example of FIGS. 4, 5, distributed configuration logic 102 of the distributed system controller 30c, updates configuration data stored in a local distributed configuration cache 124 (FIG. 4) so that the name space configuration data stored in the cache 124 of the controller 30c reflects the changes associated with the data unit life cycle event detected by a data storage system. For example, if the name space event initially detected and published by data storage system, is deletion of a data unit, for example, the name space configuration data stored in the cache 124 of the distributed system controller 30c is also updated to reflect those data unit life cycle changes.

As previously noted, in one embodiment, the name space configuration data stored in the cache 124 may include a data unit name look-up directory containing for example, data unit names, the storage location of the associated data unit, and the access privileges assigned to the associated data unit. Thus, if the name space event detected by the distributed system controller 30c is a deletion of a data unit, for example, the look-up directory may be updated to indicate that the affected data unit has been deleted.

In a similar manner, the other distributed system controllers of the complex 10, such as the distributed system controllers 30a, 30b, 30d-30f may receive a published data unit life cycle event metadata message on a persistent message bus, and automatically update configuration data stored in a local distributed configuration cache 124 (FIG. 4) associated with each distributed system controller so that the name space configuration data stored in the cache 124 of that controller also reflects the changes associated with the data unit life cycle event detected by the controller 30a which was local to the detected event. Accordingly, in one aspect of the globally available distributed services, distributed system controllers in response to a published data unit life cycle event metadata message received on a persistent message bus, automatically conform distributed services including look-up directory services, as a function of a detected data unit life cycle event to achieve eventual consistency of distributed services in the entire common name space.

In one embodiment, all distributed system controllers of the complex 10 may subscribe to or listen for all data unit life cycle event metadata messages published on the persistent message bus system 40 (FIG. 1). However, it is appreciated that in some embodiments, not all data unit life cycle event metadata messages published on the persistent message bus system 40 may be pertinent to all data storage systems of the complex 10. Thus, event subscription logic 154 (FIG. 4) of each distributed system controller may be configured to subscribe to data unit life cycle event metadata messages which relate to certain types of data unit life cycle events which are pertinent to either the receiving distributed system controller or to maintaining the consistency of the globally available distributed services. Conversely, event subscription logic 154 (FIG. 4) of each distributed system controller may be configured to not subscribe to, that is, ignore data unit life cycle event metadata messages which relate to other types of data unit life cycle events which are not pertinent to either the receiving distributed system controller nor to maintaining the consistency of the globally available distributed services.

A published data unit life cycle event metadata message has, in one embodiment, fields which provide sufficient information to permit each receiving distributed system controller to conform its distributed services to achieve eventual consistency in those distributed services. For example, the data unit life cycle event metadata message may have fields which identify what event occurred, where the event occurred, when the event occurred, who initiated the event, etc. Thus, if the data unit life cycle event metadata message relates to a deletion of a data unit, for example, the data unit life cycle event metadata message may include fields identifying the event as a deletion of data units, the data units affected, where and when the deletion was effected and the identity of the party that effected the deletion. Using this information, each distributed system controller subscribing to this data unit life cycle event metadata message can update its name space configuration data to indicate that the subject data unit or units have been deleted.

In this manner, globally available distributed services may be conformed in response to a published data unit life cycle event metadata message received on a persistent message bus, as a function of a data unit life cycle event. As a result, eventual consistency of distributed services may be achieved in the entire common name space.

In another aspect of on-demand data access in complex, heterogenous data storage in accordance with the present description, data unit life cycle events include a request for access to a data unit such as a file, object or data segment, for example. As described above, FIG. 6 depicts an example of automatic operations of a data storage system should a data unit life cycle event occur in that data storage system associated with a distributed system controller. In this example, storage system data management logic 208 of a data storage system such as the data storage system A (FIG. 2), for example, detects (block 214, FIG. 6) a request to access a data unit stored in the complex 10. If the data unit requested is stored in the data storage system which detected the data unit access request, the storage system data management logic 208 of the detecting data storage system A can access the requested data unit directly to satisfy the data unit access request. However, in another example, an action to access a file or object may be limited to importing only a corresponding stub into the file system, maintaining the local file system path name for the file. Potential expansion from a 1-to-1 mapping of file system names to 1-to-N solution could be implemented via a name-mapping algorithm. Thus, the stub could simultaneously be maintained within any number of file systems, systemA-systemF. As a result, the data need not be replicated in each file system, but may remain only in a selected storage such as a cloud storage systemD, for example.

Thus, if the data unit requested is not stored in the data storage system which detected the data unit access request, data unit life cycle event publication logic 220 (FIG. 4) of the storage system data management logic 208 of the detecting data storage system such as the data storage systemA (FIG. 2) acting as a publication source, publishes (block 224, FIG. 6) on the persistent message bus 40n (FIG. 2), a data unit life cycle event metadata message in the form of a data unit access request metadata message in response to the detected data unit life cycle event, more specifically, the data unit access request event. As explained in greater detail below, publication of a data unit access request event metadata message in response to a local data unit access request event, facilitates propagating the data unit access request across the common name space of the complex 10 in a series of recursive, cascading hops from distributed system controller to distributed system controller until the requested data unit is located and retrieved. The caches of configuration data maintained by the distributed system controllers for the common name space are utilized to direct the path of the recursive hops.

FIG. 5 depicts another example of automatic operations by a distributed system controller in response to receipt (block 150, FIG. 5) of an event metadata message which, in this example, the received event metadata message is a data unit access request metadata message. Accordingly, as described above, event subscription logic 154 (FIG. 4) of the persistent message bus interface logic 134 of the receiving distributed system controller determines (block 250, FIG. 5) whether the received data unit life cycle event metadata message is a data unit access request metadata message. In this example, the data storage systemA detected the data unit access request as described above, but the requested data unit is not stored in the data storage systemA but is instead stored in another data storage system of the complex 10 such as the data storage systemD, for example.

The distributed configuration logic 102 determines (block 254, FIG. 5) whether the requested data unit or units are stored locally or adjacent to local. As used herein, a data unit is considered to be stored locally or adjacent to local if it is stored in a data storage system associated with the distributed system controller receiving the data unit access request metadata message. In this example, the receiving distributed system controller is the distributed system controller 30a (FIG. 2). Accordingly, the distributed configuration logic 102 of the receiving distributed system controller 30a determines (block 254, FIG. 5) whether the requested data unit or units are stored locally or adjacent to local, that is, stored in either the data storage systemA or the data storage systemB associated with the receiving distributed system controller 30a.

In this example, the requested data unit is not stored locally to the receiving distributed system controller 30a, but is instead stored in another data storage system such as the systemD, for example. In one aspect of globally available distributed services by the distributed controllers, the receiving distributed system controller 30a responds to a received data unit access request metadata message by propagating the received data unit access request metadata message through a series of distributed controllers in a selected path until the requested data unit is located and retrieved, if the requested data unit is not stored locally, that is, is not stored in the data storage systemA or systemB coupled to the associated gatewayAB (FIG. 2).

Event publication and propagation logic 130 of the receiving distributed system controller, updates (block 260, FIG. 5) a pointer in the received data unit access request message to point to the next hop in a plurality of recursive, cascading hops along a path from the receiving distributed system controller, via any intermediate distributed system controllers, to the destination distributed system controller associated with the data storage system in which the requested data unit is actually stored. In this example, event publication and propagation logic 130 of the receiving distributed system controller 30a which received the data unit access request metadata message published by the storage systemA, modifies a pointer of the received data unit access request metadata message, to point to distributed system controller 30b (FIG. 2), for the next hop, that is, hop1, in a plurality of recursive, cascading hops, hop1-hop2.

Note that in the recursive case, the reader of the metadata message is also a writer.

The distributed configuration logic 102 of the receiving distributed controller includes data pathing guidance logic 270 which is configured to, as a function of name space configuration data including the data unit name look-up directory stored in its local distributed configuration cache 124, determine the identity of the destination distributed controller of the next hop along the path of recursive cascading hops, to the final destination distributed system controller for the data storage system at which the requested data unit is stored. As described above, the configuration data maintained by the distributed system controllers of the complex 10, is conformed to be eventually consistent to reflect the name space configuration changes resulting from name space configuration events, throughout the common name space of the complex 10. Thus, the name space configuration data used to identity of the destination distributed controller of the next hop along the path of recursive cascading hops, will be up-to-date to reflect any name, location or other changes to the requested data unit that may affect the determination of the path to the stored location of the requested data unit.

In this example, data pathing guidance logic 270 of the receiving distributed controller 30a which received the data unit access request metadata message published by the storage systemA, looks up in the look-up directory maintained in the name space configuration data cache 124 (FIG. 4), the name of the data unit requested by the data unit access request metadata message and determines that the distributed system controller 30b is the destination of the next hop of the recursive cascading hops, hop 1, hop2. In response, event publication and propagation logic 130 of the receiving distributed system controller 30a which received the data unit access request metadata message published by the storage systemA, modifies a pointer of the received data unit access request metadata message, to point to distributed system controller 30b (FIG. 2), for the next hop, that is, hop1, in a plurality of recursive, cascading hops, hop1-hop2. Having modified the pointer, event publication and propagation logic 130 of the receiving distributed system controller 30a forwards (block 274, FIG. 5) the received data unit access request metadata message, in the next hop, hop1 along the persistent message bus 40n, to the distributed system controller 30b (FIG. 2).

In one embodiment, the name space configuration data of an initial receiving or intermediate distributed system controller may not include data identifying the data storage system in which the requested data unit is stored. Instead, the name space configuration data including the data unit name look-up directory may include configuration data identifying the location of another cache 124 of configuration data such as the cache 124 of configuration data of an intermediate distributed system controller 30b. Accordingly, the data pathing guidance logic 270 of the receiving distributed controller 30a, determines a suitable path from the receiving distributed system controller 30a to the intermediate distributed system controller 30b. Accordingly, event publication and propagation logic 130 of the receiving distributed system controller 30a modifies a pointer of the received data unit access request metadata message, to point to the intermediate distributed system controller 30b (FIG. 2), for the next hop, that is, hop1, in a plurality of recursive, cascading hops, hop1-hop2. Upon completion of the forwarding of the received metadata message in the next hop, the operations for the receiving distributed system controller in response to the received metadata message ends (block 166).

FIG. 5 also depicts an example of automatic operations by an intermediate distributed system controller such as the distributed controller 30b, in response to receipt (block 150, FIG. 5) of a data unit access request metadata message forwarded by the distributed system controller 30a in hop1 of the recursive, cascading hops described above. Accordingly, as described above, event subscription logic 154 (FIG. 4) of the persistent message bus interface logic 134 of the receiving distributed system controller 30b determines (block 250, FIG. 5) whether the received data unit life cycle event metadata message is a data unit access request metadata message. In this example, the distributed system controller 30a systemA forwarded the data unit access request metadata message to the distributed system controller 30b as described above, but the requested data unit is not stored in any data storage system associated with the intermediate distributed system controller 30b.

Accordingly, the distributed configuration logic 102 of the intermediate receiving distributed system controller 30b determines (block 254, FIG. 5) whether the data unit or units are stored locally, that is, stored in either the data storage systemB or the data storage systemC associated with the receiving distributed system controller 30b. As noted above, in this example, the requested data unit is not stored locally to the receiving distributed system controller 30b, but is instead stored in another data storage system such as the systemD, for example. In one aspect of globally available distributed services by the distributed controllers, the receiving intermediate distributed system controller 30a responds to a received data unit access request metadata message by again propagating the received data unit access request metadata message through one or more distributed controllers in a selected path until the requested data unit is located and retrieved, if the requested data unit is not stored locally, that is, is not stored in the data storage systemB or systemC coupled to the associated gatewayBC (FIG. 2).

Event publication and propagation logic 130 of the receiving distributed system controller, updates (block 260, FIG. 5) a pointer in the received data unit access request metadata message to point to the next hop in a plurality of recursive, cascading hops along a path from the receiving distributed system controller, via any intermediate distributed system controllers, to the destination distributed system controller associated with the data storage system in which the requested data unit is actually stored. In this example, event publication and propagation logic 130 of the receiving distributed system controller 30b which received the data unit access request metadata message forwarded by the distributed system controller 30a, modifies a pointer of the received data unit access request metadata message, to point to distributed system controller 30c (FIG. 2), for the next hop, that is, hop2, in a plurality of recursive, cascading hops, hop1-hop2.

As noted above, the distributed configuration logic 102 of the receiving distributed controller includes data pathing guidance logic 270 which is configured to, as a function of name space configuration data including the data unit name look-up directory stored in its local distributed configuration cache 124, determine the identity of the destination distributed controller of the next hop along the path of recursive cascading hops, to the final destination distributed system controller for the data storage system at which the requested data unit is stored. In this example, data pathing guidance logic 270 of the receiving distributed controller 30b which received the data unit access request metadata message forwarded by the distributed system controller 30a, looks up in the look-up directory maintained in the name space configuration data cache 124 (FIG. 4), the name of the data unit requested by the data unit access request metadata message and determines that the distributed system controller 30c is the destination of the next hop of the recursive cascading hops, hop1, hop2. In response, event publication and propagation logic 130 of the receiving distributed system controller 30b which received the data unit access request metadata message forwarded by the distributed system controller 30a, modifies (block 260, FIG. 5) a pointer of the received data unit access request metadata message, to point to distributed system controller 30c (FIG. 2), for the next hop, that is, hop2, in a plurality of recursive, cascading hops, hop1-hop2.

In addition, event publication and propagation logic 130 of the receiving distributed system controller 30b determines (block 278, FIG. 5) whether the next hop is the last or final hop along the path of recursive, cascading hops to the destination distributed system controller. In this example, it is determined that the distributed system controller 30c is the destination of the last hop of the recursive cascading hops, hop1, hop2. In response, event publication and propagation logic 130 of the receiving distributed system controller 30b tags (block 282, FIG. 5) the data unit access request metadata message with a tag to indicate it is the last hop along the path of recursive, cascading hops to the destination distributed system controller 30c.

Having modified the pointer and tagged the data unit access request metadata message, event publication and propagation logic 130 of the receiving distributed system controller 30b forwards (block 274, FIG. 5) the received data unit access request metadata message, in the next hop, hop2 along the persistent message bus 40n, to the distributed system controller 30c (FIG. 2).

As noted above, in one embodiment, the name space configuration data of an intermediate distributed system controller may not include data identifying the data storage unit in which the requested data unit is stored. Instead, the name space configuration data including the data unit name look-up directory may include configuration data identifying the location of another cache 124 of configuration data such as the cache 124 of configuration data of a distributed system controller 30c, which may be either another intermediate distributed system controller of the path of recursive, cascading hops, or may be the final destination distributed system controller. Accordingly, the data pathing guidance logic 270 of the intermediate receiving distributed controller 30b, determines a suitable path from the intermediate receiving distributed system controller 30b to the next distributed system controller which is controller 30c in this example.

Accordingly, event publication and propagation logic 130 of the receiving distributed system controller 30b modifies a pointer of the received data unit access request metadata message, to point to the next distributed system controller 30c (FIG. 2), for the next hop, that is, hop2, in a plurality of recursive, cascading hops, hop1-hop2.

FIG. 5 also depicts an example of automatic operations by a destination distributed system controller such as the distributed controller 30c, in response to receipt (block 150, FIG. 5) of a data unit access request metadata message forwarded by the distributed system controller 30b in hop2 of the recursive, cascading hops described above. Accordingly, as described above, event subscription logic 154 (FIG. 4) of the persistent message bus interface logic 134 of the receiving distributed system controller 30c determines (block 160) that the received message is not a name space configuration message, and determines (block 250, FIG. 5) that the received metadata message is a data unit access request metadata message. In this example, the distributed system controller 30b forwarded the data unit access request metadata message to the distributed system controller 30c as described above. However, in this example, the requested data unit is stored in a data storage system such as the data storage system D, for example, associated with the distributed system controller 30c.

Accordingly, the distributed configuration logic 102 of the receiving distributed system controller 30c determines (block 254, FIG. 5) whether the requested data unit or units are stored locally, that is, stored in either the data storage systemC or the data storage systemD associated with the receiving distributed system controller 30c. In this example, name space configuration data stored in the local cache 124 of the receiving distributed system controller 30c indicates that the requested data unit is stored locally to the receiving distributed system controller 30c as noted above.

In one aspect of globally available distributed services by the distributed controllers, gateway interface logic 284 of the receiving destination distributed system controller 30c responds to a received data unit access request metadata message in which the requested data unit is stored locally, by directing (block 286, FIG. 5) the associated gateway service to transfer the requested data unit or units to the entity that requested that data units. In this example, the gateway interface logic 284 of the receiving distributed system controller 30c, directs (block 286) the local gatewayCD to transfer the user data of the requested data unit or units stored as an object or objects to the requesting party of the data storage systemA which is a hierarchical file system in this example.

In this manner, the requesting party of data storage systemA has on-demand access to the requested data unit, notwithstanding that the storage systemA may be in a hierarchical file system domain and the requested data unit is actually stored in a non-adjacent data storage systemC which may store data as objects in an object storage domain. In one embodiment, the requested data units may be transferred to the requesting data storage systemA directly in a suitable network connection. Alternatively, in one embodiment, the requested data units may be transferred to the requesting data storage systemA in a series of recursive, cascading hops in a manner similar to that described above in connection with a data unit access request metadata message. Thus, the gatewayCD may be directed by a metadata message receiving destination distributed system controller 30c to transfer the requested data unit from the data storage systemD to the storage systemC, the gatewayBC may be directed by a metadata message receiving distributed system controller 30b to transfer the requested data unit from the data storage systemC to the storage systemB, and the gatewayAB may be directed by a metadata message receiving distributed system controller 30a to transfer the requested data unit to the storage systemA.

Event publication and propagation logic 130 of the receiving distributed system controller 30c which received the data unit access request metadata message forwarded by the distributed system controller 30b, determines (block 290, FIG. 5) whether the received data unit access request metadata message was received in the last hop of the series of recursive, cascading hops. In this example, the forwarding distributed system controller 30b tagged the metadata message with a tag indicating that the next hop, that is, hop2, was the last hop of the path to the destination distributed system controller 30c. Upon determining that the received data unit access request metadata message has a last hop tag and thus was received in the last hop of the path, the received data unit access request metadata message need not be propagated any further through the complex 10 and the operations of FIG. 5 for the receiving distributed system controller 30c end (block 292).

Conversely, if it is determined that the received data unit access request metadata message lacks a last hop tag and thus may not be the last hop of the path, the received data unit access request metadata message may optionally be propagated further through the complex 10 by updating (block 260) the pointer of the message to point to the next hop of the path. For example, a requested data unit may be stored in multiple data storage systems and the data unit access request metadata message may be propagated to more than one of the data storage systems actually storing the requested data unit, to improve reliability and responsiveness to the request.

In another aspect of on-demand data access in complex heterogenous data storage systems in accordance with the present description, one or more of the distributed system controllers 30 (FIG. 1) include backup and restore logic 304 (FIG. 4) which is configured to facilitate backing up the distributed system controller including providing a backup copy of the name space configuration data stored in the local cache 124 of the distributed system controller. The backup copy of the configuration data may include, for example, a backup copy of a look-up directory of data unit names, and name space configuration data used in pathing guidance for forwarding metadata messages. The backup copy of the name space configuration data may be stored remotely and used to restore a distributed system controller in the event of a hardware or software failure. In this manner, distributed services globally available to the heterogenous storage systems, systemA-systemF, and the gateway connections 20a-20e, of the complex 10 may be restored in the event of a full or partial loss of one or more distributed system controllers.

In addition, the backup and restore logic 304 (FIG. 4) may be further configured to facilitate backing up and restoring a data storage system associated with a distributed system controller. For example, a data unit look-up directory maintained by a distributed system controller may indicate that an associated data storage system includes a file system having inodes which have no data blocks and are imported from object storage. Known backup and restore systems such as Scale Out Backup and Restore (SOBAR) services marketed by IBM Corporation for cloud services, for example, is a method of disaster recovery or service migration that uses existing GPFS" or SOBAR command along with cloud services scripts to backup configuration and file systems metadata on one storage system or cluster of storage systems and restore the metadata on a recovery system or cluster of systems. Accordingly, the backup and restore logic 304 (FIG. 4) may be further configured to direct an inode backup and restore system such as SOBAR, for example, to facilitate backup and restoring of a data storage system which includes inodes.

In yet another aspect of on-demand data access in complex heterogenous data storage systems in accordance with the present description, the backup and restore logic 304 (FIG. 4) may be further configured to facilitate adding a storage system to the plurality of heterogenous storage systems including extending the common name space to the added storage system. It is appreciated that name space events which triggered configuration of the common name space, occurred prior to the adding of the new data storage system of the complex 10, and hence are not available for use in extending the common name space to the added storage system.

In one embodiment, the backup and restore logic 304 (FIG. 4) may be further configured to clone a copy of one or more look-up directories of data unit names of one or more existing data storage systems of the plurality of heterogenous storage systems in the common name space, and mine the cloned copies for appropriate selected data unit name entries. Using the mined entries, an added distributed system controller associated with an added storage system may be configured to have its own look-up directory, to extend the common name space to the added storage system and associated added distributed system controller.

For example, a snapshot copy of the configuration data of one or more distributed system controllers may be used to synchronize an added distributed system controller of an added data storage system or cluster of data storage systems with a current distributed system controllers of the complex. SOBAR in Spectrum Scale cloud services marketed by IBM Corporation, is an example of a service capable of providing a snapshot of inodes that may be used for cloning and mining, to synchronize an added distributed system controller with current distributed system controllers of the complex. In another embodiment, metadata describing name space events may be stored in a database. In a manner similar to that described above in connection with a snapshot, such a database may be mined and leveraged to synchronize an added distributed system controller with current distributed system controllers of the complex. Meta-Ocean marketed by IBM Corporation is an example of a suitable analytic program which may be modified as appropriate to manage the capture of name space events in a database to extend a common name space.

It is seen from the above that on-demand data access in complex, heterogenous data storage in accordance with the present description, in one embodiment, significantly improves efficient and economical operation of a data storage system. Other aspects and advantages may be realized, depending upon the particular application.

A system of one or more computers may be configured for on-demand data access in complex heterogenous data storage in a data storage system in accordance with the present description, by virtue of having software, firmware, hardware, or a combination of them installed on the system that in operation causes or cause the system to perform on-demand data access in complex heterogenous data storage in accordance with the present description. For example, one or more computer programs may be configured to perform on-demand data access in complex heterogenous data storage in a data storage system by virtue of including instructions that, when executed by data processing apparatus such as for example a storage controller processor, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software-controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Cloud Computing Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
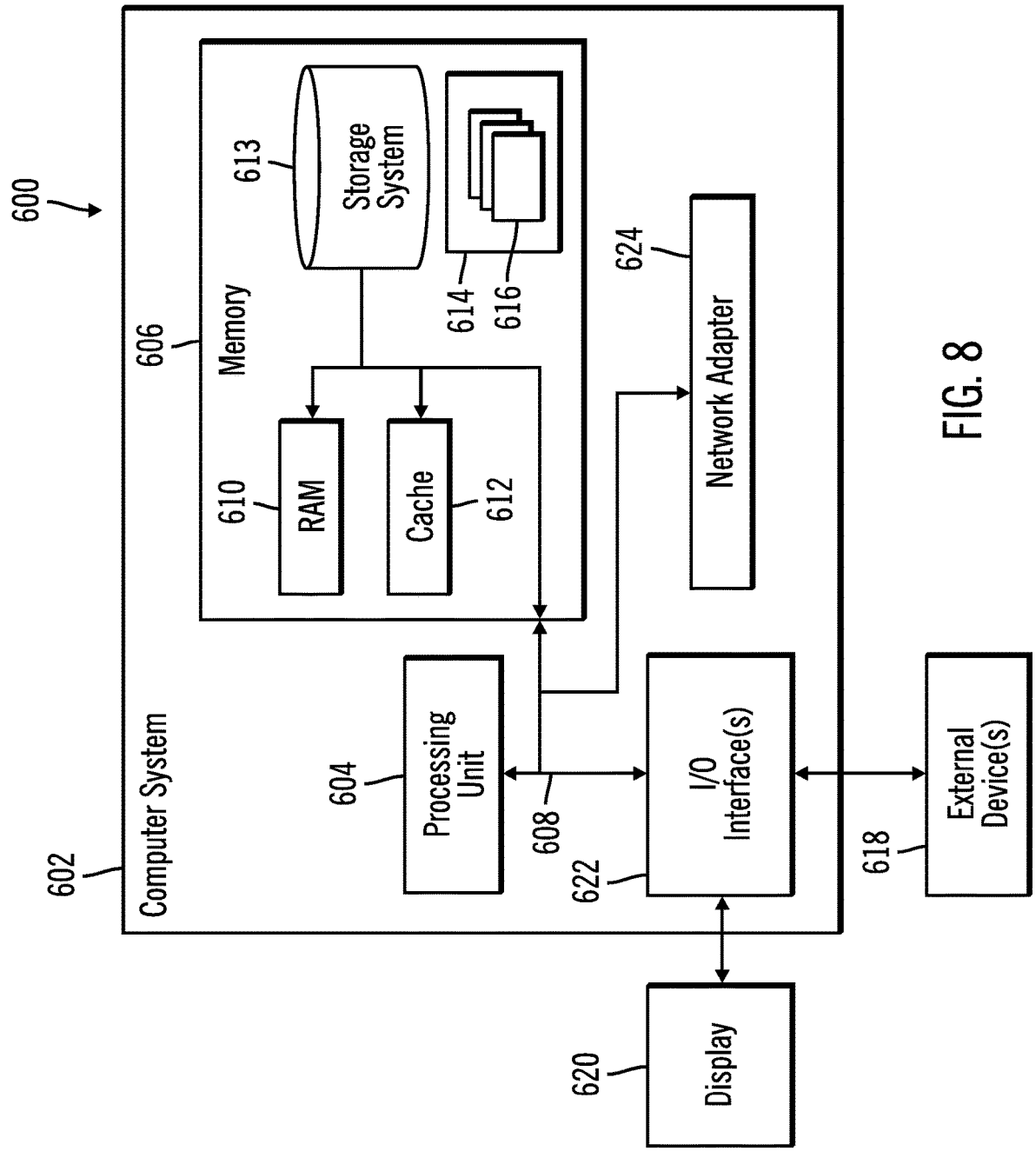
FIG. 8 illustrates a computer embodiment employing on-demand data access in complex, heterogenous data storage in accordance with the present description.

Referring now to FIG. 8, a schematic of an example of a data storage system such as a cloud computing node 600, for example, in a complex of heterogenous data storage systems in accordance with the present description is shown, such as heterogenous data storage systems, systemA-systemF with distributed system controllers 30 and persistent message busses 40 that implement on-demand access. Cloud computing node 600 is only one example of a suitable data storage system or cloud computing node and is not intended to suggest any limitation as to the scope of use or functionality of embodiments of the invention described herein. Regardless, cloud computing node 600 is capable of being implemented and/or performing any of the functionality set forth hereinabove.

In cloud computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 602 in cloud computing node 600 is shown in the form of a general-purpose computing device. The components of computer system/server 602 may include, but are not limited to, one or more processors or processing units 604, a system memory 606, and a bus 608 that couples various system components including system memory 606 to processor 604.

Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 20. As depicted, network adapter 624 communicates with the other components of computer system/server 602 via bus 608. It should be understood that although not shown, other hardware and/or software components could be used in conjunction with computer system/server 602. Examples include, but are not limited to: microcode, device drivers, redundant processing units, external disk drive arrays, RAID systems, tape drives, and data archival storage systems, etc.

Figure 9:
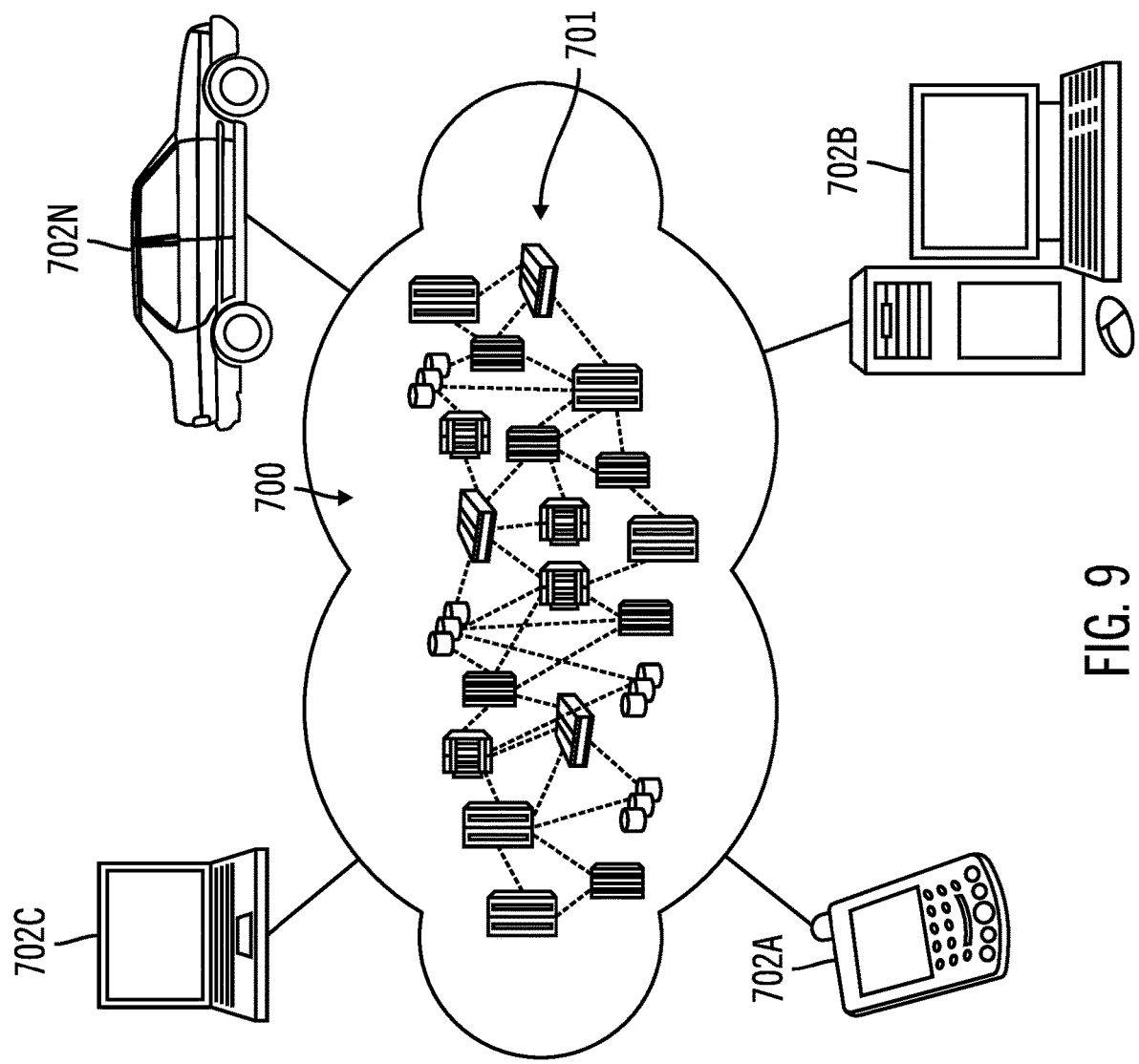
FIG. 9 depicts an embodiment of a cloud computing environment.

Referring now to FIG. 9, illustrative cloud computing environment 700 is depicted. As shown, cloud computing environment 700 comprises one or more cloud computing nodes 701, with which local computing devices used by cloud consumers, such as, for example, personal digital assistant (PDA) or cellular telephone 702A, desktop computer 702B, laptop computer 702C, and/or automobile computer system 702N may communicate. Nodes 701 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 702A-N shown in FIG. 9 are intended to be illustrative only and that computing nodes 701 and cloud computing environment 700 can communicate with any type of computerized device over any type of network and/or network addressable connection (e.g., using a web browser).

Figure 10:
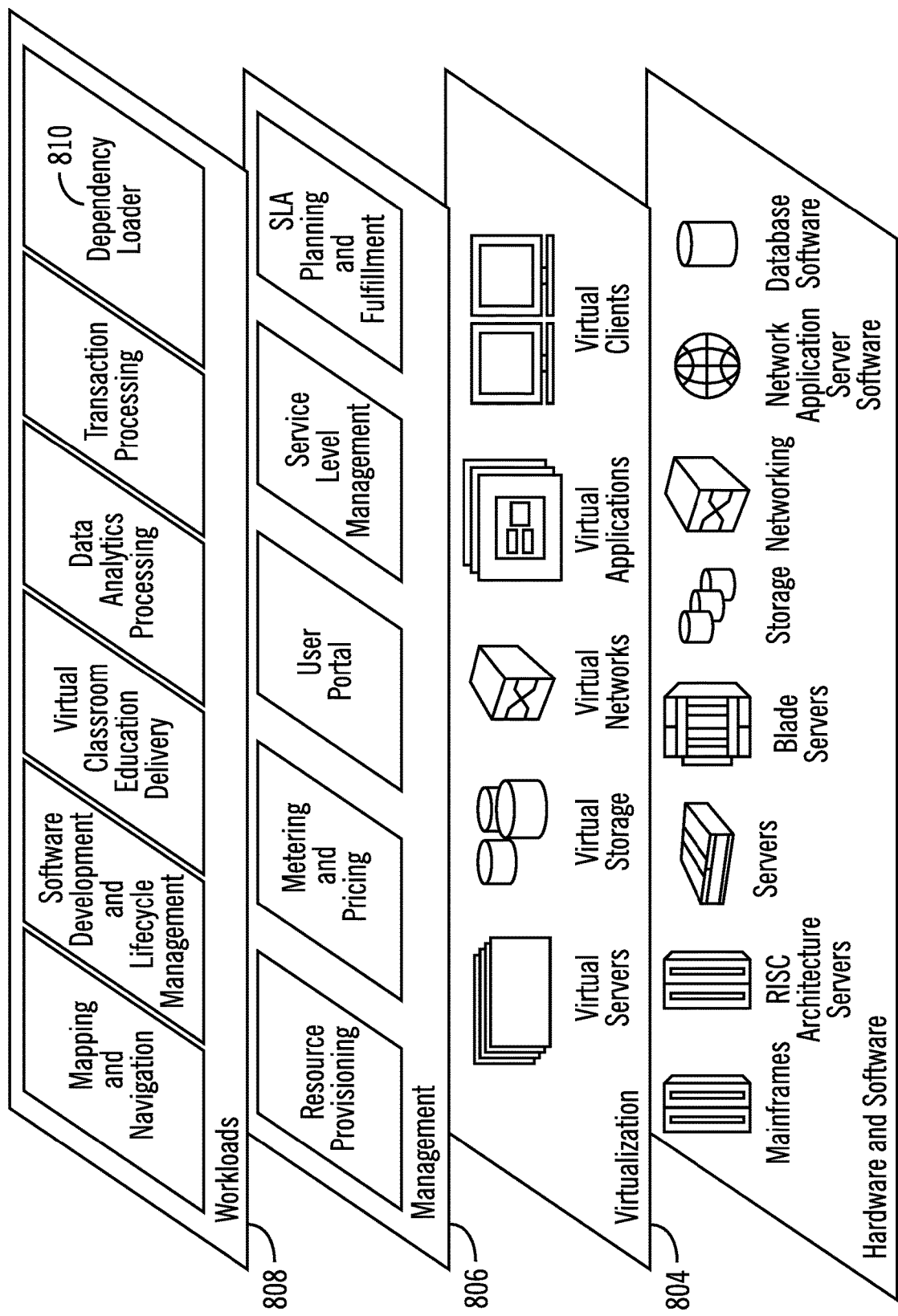
FIG. 10 depicts an embodiment of abstraction model layers of a cloud computing environment.

Referring now to FIG. 10, a set of functional abstraction layers provided by cloud computing environment 700 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 802 includes hardware and software components. Examples of hardware components include: mainframes; RISC (Reduced Instruction Set Computer) architecture-based servers; storage devices; networks and networking components. In some embodiments, software components include network application server software.

Virtualization layer 804 provides an abstraction layer from which the following examples of virtual entities may be provided: virtual servers; virtual storage; virtual networks, including virtual private networks; virtual applications and operating systems; and virtual clients.

In one example, management layer 806 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 808 provides examples of functionality for which the cloud computing environment may be utilized. Examples of workloads and functions which may be provided from this layer include: mapping and navigation; software development and lifecycle management; virtual classroom education delivery; data analytics processing;

transaction processing; and a dependency loader 810 to load dependency library files into the application runtime environment are provided as part of the cloud computing service.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A system, comprising:
    a plurality of heterogeneous data storage systems linked in a graph configuration in which each storage system is linked directly to one or more adjacent storage systems, and is linked indirectly to one or more non-adjacent storage systems, via at least one intermediate storage system wherein a storage system has an object domain;
    a common name space for data units stored in the plurality of heterogeneous data storage systems;
    a persistent message bus for name space metadata event messages; and
    distributed system controllers coupled to the persistent message bus, associated with the plurality of heterogeneous data storage systems and configured to provide globally available distributed services including distributed configuration services enforcing access privileges to data units stored in the plurality of heterogeneous data storage systems, and responding to name space metadata event messages received from the persistent message bus for events in the common name space to achieve eventual consistency of distributed services in the entire common name space.

2. The system of claim 1 wherein a data storage system of the plurality of heterogeneous data storage systems is configured to store a data unit, and wherein the distributed system controllers include a source distributed system controller configured to publish on a persistent message bus, a common name space configuration event metadata message in response to a common name space configuration event, wherein a common name space configuration event includes a change in access privileges to a data unit stored in a data storage system of the plurality of heterogeneous data storage systems, and distributed system controllers are further configured to, in response to a published common name space configuration event metadata message received on a persistent message bus, conform distributed services as a function of a common name space configuration event to achieve eventual consistency of distributed services in the entire common name space wherein conformed distributed services include consistent data unit access privileges in the entire common name space.

3. The system of claim 2 further comprising a source data storage system configured to publish on a persistent message bus, a data unit life cycle event metadata message in response to a data unit life cycle event wherein a data unit life cycle event includes a change to a data unit stored in a data storage system of the plurality of heterogeneous data storage systems, wherein distributed system controllers are further configured to, in response to a published data unit life cycle event metadata message received on a persistent message bus, conform distributed services as a function of a data unit life cycle event to achieve eventual consistency of distributed services in the entire common name space wherein conformed distributed services include eventually consistent data unit name look-up directory services in the entire common name space.

4. The system of claim 3 further comprising a plurality of gateways, each gateway coupling adjacent data storage systems, and a source data storage system configured to initiate on a persistent message bus, a data unit access request metadata message in response to a data unit request to access a data unit stored in a data storage system of the plurality of heterogeneous data storage systems, wherein a distributed system controller is further configured to provide an additional service of the globally available distributed services including being configured to respond to a received data unit access request metadata message by directing an associated gateway for adjacent data storage systems to transfer a data unit requested by the received data unit access request metadata message if a requested data unit is stored in a data storage system coupled to the associated gateway, and propagate the received data unit access request metadata message to another distributed controller in a selected path if a requested data unit is not stored in a data storage system coupled to the associated gateway.

5. The system of claim 4 wherein distributed systems controllers being configured to provide a globally available distributed service of propagating a data unit access request metadata message includes distributed system controllers being configured to recursively modify, as a function of conformed, consistent data unit name look-up directory services, a pointer in the received data unit access request metadata message in a plurality of recursive, cascading hops in the selected path from a source distributed system controller which received a data unit access request metadata message, via an intermediate distributed system controller, to a destination distributed system controller associated with a destination data storage system storing requested user data of a data unit access request, to forward and guide the data unit access request metadata message in the selected path including at least one persistent message bus to another distributed controller along the selected path, to recursively issue at each distributed system controller along the selected path, a data unit access request until requested user data is retrieved from the destination storage system, wherein a destination distributed system controller is further configured to respond to a received data unit access request metadata message by directing a gateway associated with the destination data storage system to transfer user data of a data unit requested by the received data unit access request metadata message.

6. The system of claim 5 wherein distributed systems controllers being configured to provide a globally available distributed service of propagating a data unit access request metadata message includes an intermediate distributed system controller being configured to add, as a function of a conformed, consistent data unit name look-up directory, a tag to a received data unit access request metadata message to indicate whether a next hop is a final hop of the plurality of recursive, cascading hops, and forward the tagged metadata message to the destination distributed system controller.

7. The system of claim 1 wherein conformed distributed services are a function of configuration data stored in association with each distributed system controller, wherein a distributed system controller is further configured to back up stored configuration data to provide a backup copy of configuration data including a backup copy of a look-up directory of data unit names, and restore look-up directory services as a function of a backup copy of a look-up directory of data unit names.

8. The system of claim 7 further comprising a storage system added to the plurality of heterogeneous storage system, wherein a distributed system controller is further configured to extend the common name space to the added storage system including being configured to clone a copy of a look-up directory of data unit names of an existing storage system of the plurality of heterogeneous storage systems in the common name space, mine the cloned copy for selected data unit name entries and configure the added storage system to have a look-up directory using the mined data unit name entries, to extend the common name space to the added storage system.

9. A method, comprising:
establishing a plurality of heterogeneous data storage systems linked in a graph configuration in which each storage system is linked directly to one or more adjacent storage systems, and is linked indirectly to one or more non-adjacent storage systems, via at least one intermediate storage system wherein a storage system has an object domain;
establishing a common name space for data units stored in the plurality of heterogeneous data storage systems;
propagating published name space metadata event messages on a persistent message bus; and
distributed system controllers coupled to the persistent message bus, associated with the plurality of heterogeneous data storage systems and providing globally available distributed services including distributed configuration services enforcing access privileges to data units stored in the plurality of heterogeneous data storage systems, and responding to name space metadata event messages received from the persistent message bus for events in the common name space to achieve eventual consistency of distributed services in the entire common name space.

10. The method of claim 9 wherein globally available distributed services of the distributed system controllers further comprise a source distributed system controller publishing on a persistent message bus, a common name space configuration event metadata message in response to a common name space configuration event, wherein a common name space configuration event includes a change in access privileges to a data unit stored in a data storage system of the plurality of heterogeneous data storage systems, and distributed system controllers in response to a published common name space configuration event metadata message received on a persistent message bus, conforming distributed services as a function of a common name space configuration event to achieve eventual consistency of distributed services in the entire common name space wherein conformed distributed services include consistent data unit access privileges in the entire common name space.

11. The method of claim 10 further comprising a source data storage system publishing on a persistent message bus, a data unit life cycle event metadata message in response to a data unit life cycle event wherein a data unit life cycle event includes a change to a data unit stored in a data storage system of the plurality of heterogeneous data storage systems, wherein globally available distributed services of the distributed system controllers further comprise distributed system controllers in response to a published data unit life cycle event metadata message received on a persistent message bus, conforming distributed services as a function of a data unit life cycle event to achieve eventual consistency of distributed services in the entire common name space wherein conformed distributed services include eventually consistent data unit name look-up directory services in the entire common name space.

12. The method of claim 11 further comprising a source data storage system initiating on a persistent message bus, a data unit access request metadata message in response to a data unit request to access a data unit stored in a data storage system of the plurality of heterogeneous data storage systems, wherein the globally available distributed services by a distributed controller include responding to a received data unit access request metadata message by directing an associated gateway between adjacent data storage systems to transfer a data unit requested by the received data unit access request metadata message if a requested data unit is stored in a data storage system coupled to the associated gateway, and propagating the received data unit access request metadata message to another distributed controller in a selected path if a requested data unit is not stored in a data storage system coupled to the associated gateway.

13. The method of claim 12 wherein propagating a data unit access request metadata message includes distributed system controllers recursively modifying, as a function of conformed, consistent data unit name look-up directory services, a pointer in the received data unit access request metadata message in a plurality of recursive, cascading hops in the selected path from a source distributed system controller which received a data unit access request metadata message, via an intermediate distributed system controller, to a destination distributed system controller associated with a destination data storage system storing requested user data of a data unit access request, to forward and guide the data unit access request metadata message in the selected path including at least one persistent message bus to another distributed controller along the selected path, to recursively issue at each distributed system controller along the selected path, a data unit access request until requested user data is retrieved from the destination storage system, wherein a destination distributed system controller responds to a received data unit access request metadata message by directing a gateway associated with the destination data storage system to transfer user data of a data unit requested by the received data unit access request metadata message.

14. The method of claim 13 wherein propagating a data unit access request metadata message includes an intermediate distributed system controller adding, as a function of a conformed, consistent data unit name look-up directory, a tag to a received data unit access request metadata message to indicate whether a next hop is a final hop of the plurality of recursive, cascading hops, and forwarding the tagged metadata message to the destination distributed system controller.

15. The method of claim 9 wherein conformed distributed services are a function of configuration data stored in association with each distributed system controller, the method further comprising:
  backing up stored configuration data to provide a backup copy of configuration data including a backup copy of a look-up directory of data unit names; and
  restoring look-up directory services as a function of a backup copy of a look-up directory of data unit names.

16. The method of claim 15 further comprising adding a storage system to the plurality of heterogeneous storage systems and extending the common name space to the added storage system including cloning a copy of a look-up directory of data unit names of an existing storage system of the plurality of heterogeneous storage systems in the common name space, mining the cloned copy for selected data unit name entries and configuring the added storage system to have a look-up directory using the mined data unit name entries, to extend the common name space to the added storage system.

17. A computer program product configured for use in a plurality of data storage systems, wherein the computer program product comprises a computer readable storage medium having program instructions embodied therewith, the program instructions executable by a processor to cause processor operations, the processor operations comprising:
  establishing a plurality of heterogeneous data storage systems linked in a graph configuration in which each storage system is linked directly to one or more adjacent storage systems, and is linked indirectly to one or more non-adjacent storage systems, via at least one intermediate storage system wherein a storage system has an object domain;
  establishing a common name space for data units stored in the plurality of heterogeneous data storage systems;
  propagating published name space metadata event messages a persistent message bus; and
  distributed system controllers coupled to the persistent message bus, associated with the plurality of heterogeneous data storage systems and providing globally available distributed services including distributed configuration services enforcing access privileges to data units stored in the plurality of heterogeneous data storage systems, and responding to name space metadata event messages received from the persistent message bus for events in the common name space to achieve eventual consistency of distributed services in the entire common name space.

18. The computer program product of claim 17 wherein globally available distributed services of the distributed system controllers further comprise a source distributed system controller publishing on a persistent message bus, a common name space configuration event metadata message in response to a common name space configuration event, wherein a common name space configuration event includes a change in access privileges to a data unit stored in a data storage system of the plurality of heterogeneous data storage systems, and distributed system controllers in response to a published common name space configuration event metadata message received on a persistent message bus, conforming distributed services as a function of a common name space configuration event to achieve eventual consistency of distributed services in the entire common name space wherein conformed distributed services include consistent data unit access privileges in the entire common name space.

19. The computer program product of claim 18 wherein the operations further comprise a source data storage system publishing on a persistent message bus, a data unit life cycle event metadata message in response to a data unit life cycle event wherein a data unit life cycle event includes a change to a data unit stored in a data storage system of the plurality of heterogeneous data storage systems, wherein globally available distributed services of the distributed system controllers further comprise distributed system controllers in response to a published data unit life cycle event metadata message received on a persistent message bus, conforming distributed services as a function of a data unit life cycle event to achieve eventual consistency of distributed services in the entire common name space wherein conformed distributed services include eventually consistent data unit name look-up directory services in the entire common name space.

20. The computer program product of claim 19 wherein the operations further comprise a source data storage system initiating on a persistent message bus, a data unit access request metadata message in response to a data unit request to access a data unit stored in a data storage system of the plurality of heterogeneous data storage systems, wherein the globally available distributed services by a distributed controller include responding to a received data unit access request metadata message by directing an associated gateway between adjacent data storage systems to transfer a data unit requested by the received data unit access request metadata message if a requested data unit is stored in a data storage system coupled to the associated gateway, and propagating the received data unit access request metadata message to another distributed controller in a selected path if a requested data unit is not stored in a data storage system coupled to the associated gateway.

21. The computer program product of claim 20 wherein propagating a data unit access request metadata message includes distributed system controllers recursively modifying, as a function of conformed, consistent data unit name look-up directory services, a pointer in the received data unit access request metadata message in a plurality of recursive, cascading hops in the selected path from a source distributed system controller which received a data unit access request metadata message, via an intermediate distributed system controller, to a destination distributed system controller associated with a destination data storage system storing requested user data of a data unit access request, to forward and guide the data unit access request metadata message in the selected path including at least one persistent message bus to another distributed controller along the selected path, to recursively issue at each distributed system controller along the selected path, a data unit access request until requested user data is retrieved from the destination storage system, wherein a destination distributed system controller responds to a received data unit access request metadata message by directing a gateway associated with the destination data storage system to transfer user data of a data unit requested by the received data unit access request metadata message.

22. The computer program product of claim 21 wherein propagating a data unit access request metadata message includes an intermediate distributed system controller adding, as a function of a conformed, consistent data unit name look-up directory, a tag to a received data unit access request metadata message to indicate whether a next hop is a final hop of the plurality of recursive, cascading hops, and forwarding the tagged metadata message to the destination distributed system controller.

23. The computer program product of claim 17 wherein conformed distributed services are a function of configuration data stored in association with each distributed system controller, the operations further comprising:
    backing up stored configuration data to provide a backup copy of configuration data including a backup copy of a look-up directory of data unit names; and
    restoring look-up directory services as a function of a backup copy of a look-up directory of data unit names.

24. The computer program product of claim 23 wherein the operations further comprise adding a storage system to the plurality of heterogeneous storage systems and extending the common name space to the added storage system including cloning a copy of a look-up directory of data unit names of an existing storage system of the plurality of heterogeneous storage systems in the common name space, mining the cloned copy for selected data unit name entries and configuring the added storage system to have a look-up directory using the mined data unit name entries, to extend the common name space to the added storage system.

* * * * *